Oct. 14, 1969　　　A. P. NEDYALKOV　　　3,472,100
DEVICE FOR AUTOMATIC CONTROL OVER GEAR SHIFTING IN GEARBOX
Filed Feb. 28, 1967　　　　　　　　　　　　　3 Sheets-Sheet 1

INVENTOR:
Arkady Petrovich
Nedyalkov
ATTORNEY:
Glascock, Downing & Seebold

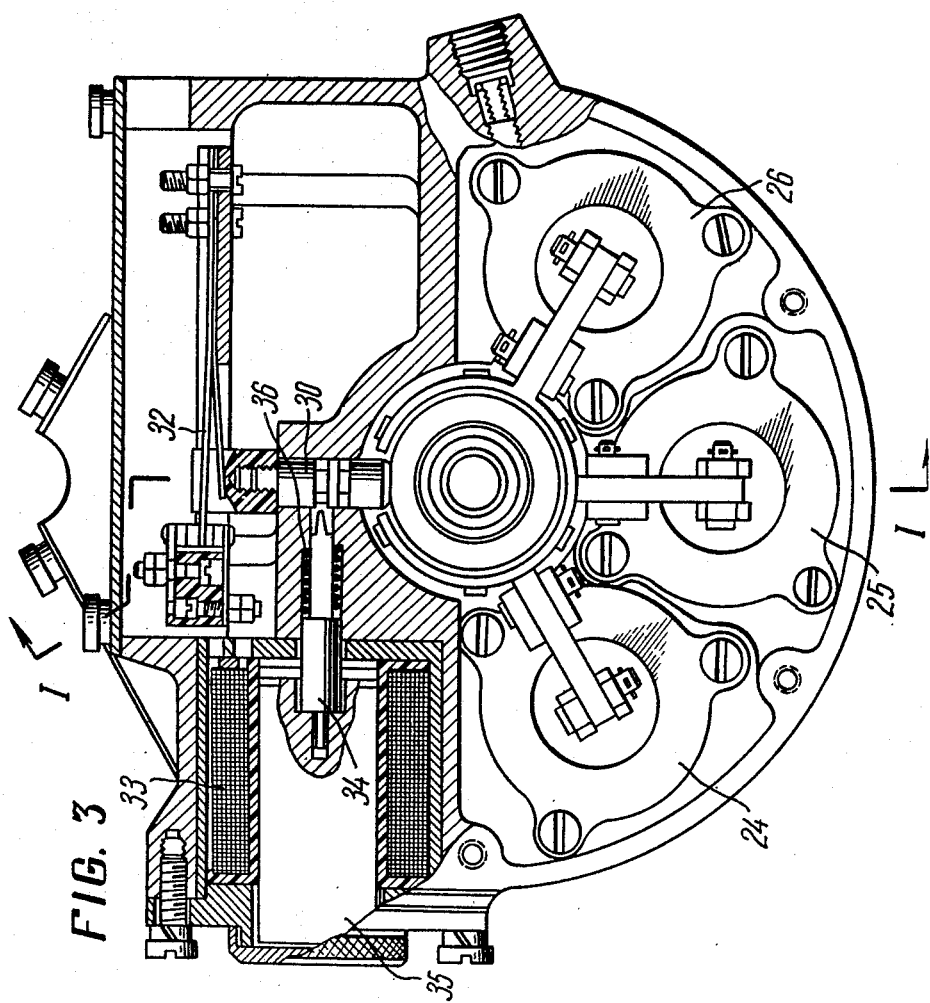

_United States Patent Office_

3,472,100
Patented Oct. 14, 1969

1

3,472,100
DEVICE FOR AUTOMATIC CONTROL OVER GEAR SHIFTING IN GEARBOX
Arkady Petrovich Nedyalkov, Likhachevskoe shosse, 13/2, kv. 29, Moscow, U.S.S.R.
Filed Feb. 28, 1967, Ser. No. 619,287
Int. Cl. F16h *19/00, 33/00, 29/00*
U.S. Cl. 74—859     3 Claims

ABSTRACT OF THE DISCLOSURE

A device for automatic control over gear shifting in a gearbox in which centrifugal and load pickups mechanically interconnected and which exert action on the master device make it possible to ensure the independence of adjustment according to each gear shifting.

---

The present invention relates to devices for the automatic control of gear shifting, and more particularly, to mechanical devices designed for above purposes.

Devices are known for the automatic control of gear shifting depending upon the speed of movement and the throttle position. These prior devices incorporate a centrifugal pickup comprising levers rotating together with a shaft, a load pickup connected to the centrifugal pickup and a control means which registers the result of coaction of the centrifugal and load pickups and transmits a signal to the shifting arrangement of the gear box.

A disadvantage of the currently employed devices for the automatic control of gear shifting is that it is difficult to insure the independent adjustment of the device according to each gear shifting, thereby not permitting optimum characteristics of changing the gears as well as optimum acceleration and economies of a particular automobile to be obtained.

In view of the foregoing, the object of the present invention is to eliminate the disadvantages of the known devices.

Another object of the invention is to provide a device for the automatic control of gear shifting which insures the independence of adjustment according to each gear shifting requirement.

Still another object of the invention is to improve gear shifting characteristics.

In the accomplishment of the above and other objects of the present invention in the centrifugal pickup of the device each pair of centrifugal levers is furnished with weights fixed when in operation but adjustably movable along the levers, the shaft of the centrifugal pickup being made hollow.

Connection between the centrifugal pickup and the load pickup is effected through telescopic push rods housed inside the shaft, and through connecting members fixed on the rods' ends coacting with power members of the load pickup, each rod being affected by one of the pairs of centrifugal levers.

The device can be furnished with members limiting the angle of rotation of each pair of centrifugal levers, said members being arranged on the shaft of the centrifugal pickup and made with the possibility of being displaced to control the angle of rotation of said levers.

The device may incorporate a locking unit connected to the telescopic rods through a control means comprising an electromagnet and lock pins installed on the armature of the electromagnet. The electromagnet having operated, the lock pins enter the grooves of the control means pushers to avoid a spontaneous or inadvertant gear shifting.

Other objects and advantages of the invention will be

2 more apparent upon consideration of an exemplary embodiment thereof and accompanying drawings wherein:

FIG. 3 is a view taken along line III—III of FIG. 1, the view looking in the direction of the arrows.

Figure 2:
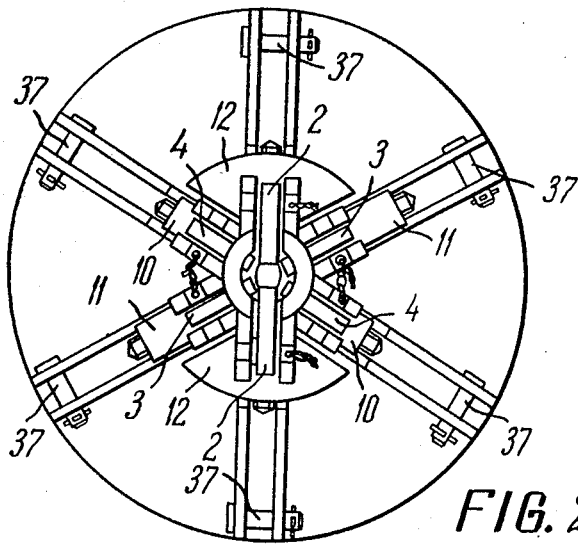
FIG. 2 is a view taken along line II—II of FIG. 1, the view looking in the direction of the arrows.

In describing the preferred embodiment of the present invention illustrated in the drawings specific terminology will be employed for the sake of clarity. However, it is not intended to be limited to the specific terms so selected, and it is to be understood that each specific term includes all technical equivalents which operate in a similar manner to accomplish a similar purpose.

Figure 1:
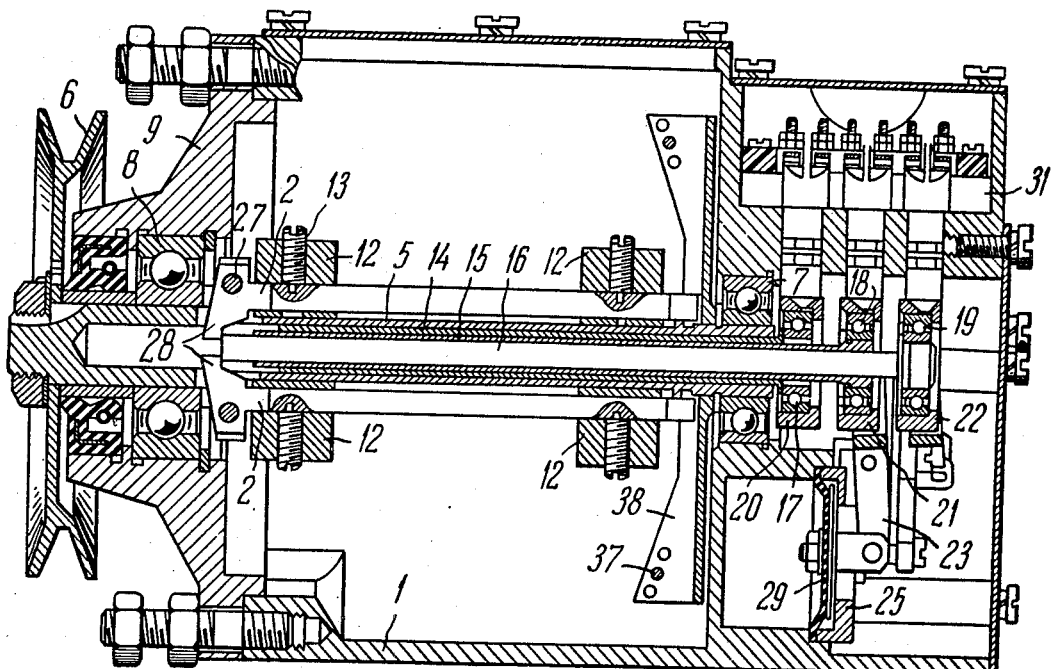
FIG. 1 is a view taken along line I—I of FIG. 3, as in the view looking in the direction of the arrows, of the device according to the invention.

It will be seen that body 1 (FIG. 1) of the device for the automatic control of gear shifting accommodates a centrifugal pickup having three pairs of levers 2, 3 and 4 (FIG. 2) and a shaft 5 (FIG. 1) to which rotation is imparted from the drive shaft of the gearbox (not shown in the drawing) through a pulley 6. The shaft rotates in bearings 7 and 8, a cover 9 and installed in body 1 respectively, with the cover 9 being fixed to the body.

An exemplary embodiment of the present device is designed for use with a four-stage gearbox. By means of screws 13 weights 10, 11 and 12 (FIG. 2) are fastened in pairs, respectively, on each of the levers 2, 3 and 4. The weights 10, 11 and 12 can be displaced along the levers for adjustment purposes and fixed in various positions.

The shaft 5 (FIG. 1) is hollow and telescopic push rods 14, are located within the shaft 15 and 16, with one pair of levers influencing each of the rods. Bearings 17, 18 and 19 are provided on the ends of the rods 14, 15 and 16 and are mounted in sleeves 20, 21 and 22, respectively. The rods 14, 15 and 16 are connected through the sleeves 20, 21, 22 and levers 23 (one of which is shown in the drawing) to load pickups 24, 25 and 26 (FIG. 3). Each of the sleeves 20, 21 and 22 (FIG. 1) and a corresponding lever 23 constitute connecting members coupling the centrifugal pickup with the load pickup.

Under the effect of a centrifugal force of the weights any pair of levers, e.g. pair 2, rotates about axles 27 and by lugs 28 shifts corresponding rod 16. The force of shifting the rod 16 is transmitted through the bearing 19 and sleeve 22 to a diaphragm 29 of a corresponding load pickup 25. The axial movement of the sleeve 22 effects vertical displacement of one of pushers 30 of a control means 31 and the control means provides for the control over plate contacts 32.

The device for the automatic gear shifting is equipped with a locking unit which comprises electromagnet 33 and lock pin 34 mounted on armature 35 of the electromagnet.

Electromagnet 33 being excited when contacts 43 are locked, the pedal 39 being in unpressed condition, then the armature 35 presses the pin 34 and the pin 34 presses upon spring 36 to provide for the locking of the pusher 30 which then cannot move in an axial direction. The locking unit may have several pins. Stops 37 being a means for limiting the angle of turning of the levers are displaced along plates 38 fixed on the shaft 5.

Figure 4:
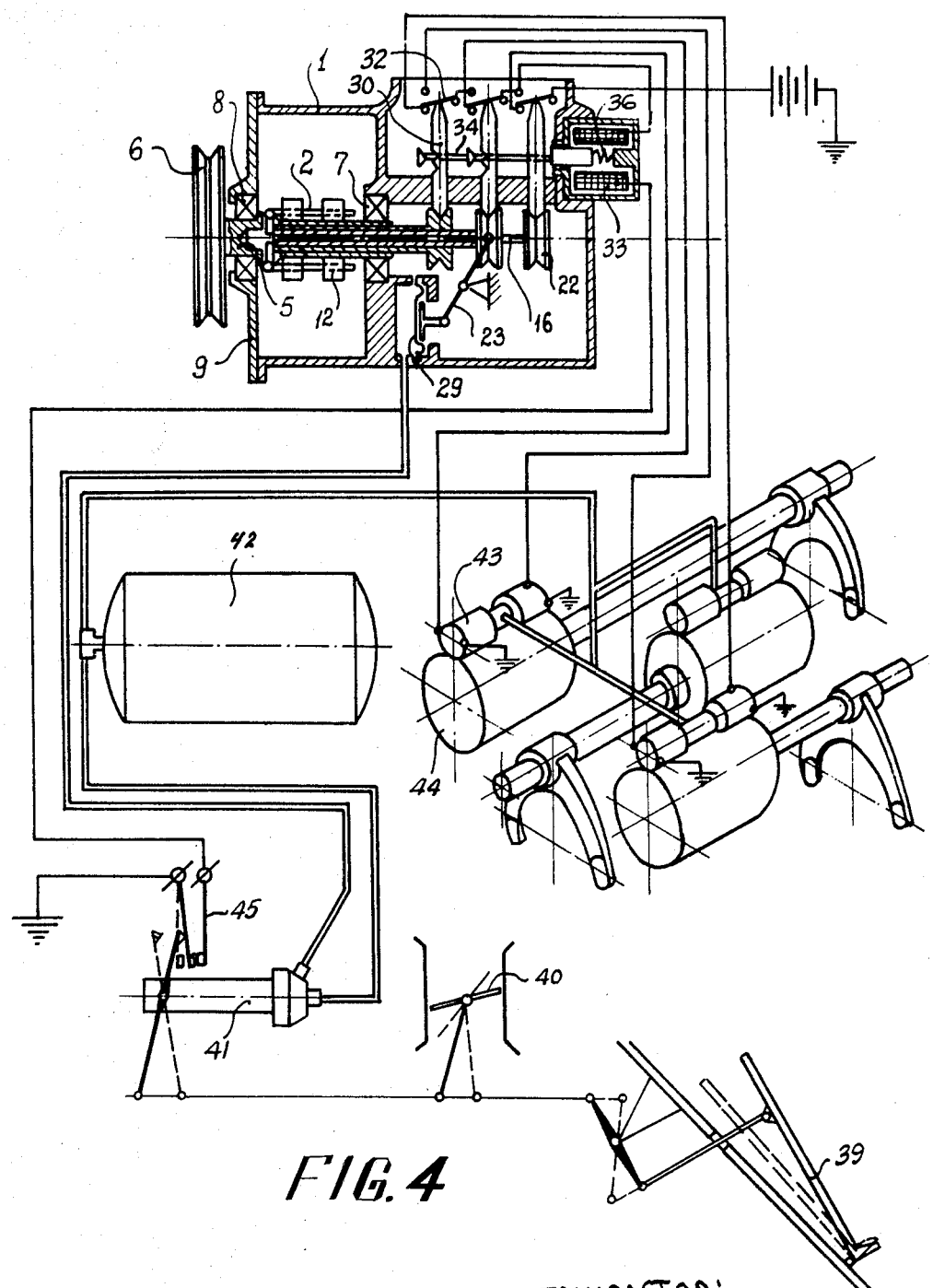
FIG. 4 is a diagrammatic view of the invention.

Dependent upon the position of the pedal 39 (FIG. 4) for controlling a throttle 40, a certain value of pressure is maintained in the spaces of the load pick-ups 24, 25 and 26 connected with a pressure control 41 fed from a receiver 42 of the pneumatic system.

The weights rotate about the axles 27 (FIG. 1) when the torque from the centrifugal force of the weights 12 becomes greater than the moment from the diaphragm 29. The higher the pressure exerted upon the diaphragm 29 the higher the speed at which the rotation of levers 2 will be effected as well as throwing in of the next gear.

During axial movement of the sleeve 22 relative displacement of the tapered surface of the pusher 30 occurs on the tapered surface of the notch in the wall of the sleeve 22 which effects a vertical displacement of the pusher 30 while the plate contacts 32 lock chain feeding electric valves 43 which control corresponding pneumatic cylinders 44.

Further gear shifting will occur with an additional increase of the automobile speed, and the next two levers 3 (FIG. 2), having weights 11 of a smaller mass than those of the first pair of levers, overcome the force of the diaphragm of the load pickup 25 (the diaphragm not shown in the drawing) and then shift an appropriate rod 15 to ensure locking of the respective contacts controlling the throwing in of the next gear.

The functioning of a third pair of levers is similar.

When the pedal 39 is in an unpressed condition, spontaneous gear shifting is prevented since contacts 45 are locked, the electro-magnet 33 excited and the pin 34 locks the pusher 30. The levers traveling under the action of centrifugal force, approach stops 37 (FIG. 1) constituted by pins, with the centrifugal force of the weights increasing due to an increase in the radius of rotation. Due to this factor, the shifting from fast to slow will occur at a slower speed of the automobile, with the pressure exerted on the diaphragm being the same. This provides for a required limit of gears overlapping.

To change the value of gears overlapping without changing the initial moment, the weights are moved along the levers symmetrically in regard to their initial position when their masses are equal, and when using the weights of different mass they are moved in opposite directions to distances inversely proportional to their masses, so as to maintain a constant initial moment and to alter the final moment.

Although the present invention has been described with reference to the preferred embodiment thereof, various alterations and modifications can be made without departing from the spirit and scope of the invention as those skilled in the art will easily understand.

These modifications and alterations are considered as falling within the spirit and scope of the invention and the appended claims.

I claim.

1. A device for the automatic control over gear shifting in a gearbox depending upon the speed and position of a throttle, comprising a rotatable hollow shaft, a centrifugal pickup defined by pairs of levers rotating together with said hollow shaft, weights displaceable along said pairs of levers, load pickups to select the power operating conditions of an engine, means for connecting the load pickups with the centrifugal pickup, said connecting means including telescopic rods located within said hollow shaft, each of said rods being influenced by one pair of said levers, and connecting members fixed on the ends of said telescopic rods and coacting with said load pickups.

2. A device for the automatic control over gear shifting in a gearbox depending upon the speed and position of the throttle, comprising a rotatable hollow shaft, a centrifugal pickup defined by pairs of levers rotating together with said hollow shaft, weights displaceable along said pairs of levers, load pickups to select the power operating conditions of an engine, means for connecting said load pickups with said centrifugal pickup, said connecting means including telescopic rods located within said hollow shaft, each of said rods being influenced by one pair of said levers, a connecting member fixed on the end of each of said telescopic rods and coating with said load pickups, and means for limiting the angle of turning of each pair of said levers, with said limiting means being capable of being displaced to control the angle of turning of said pairs of levers.

3. A device for the automatic control over gear shifting in a gearbox depending upon the speed and position of a throttle, comprising a rotatable hollow shaft, a centrifugal pickup defined by pairs of levers rotating together with said hollow shaft, weights displaceable along said pairs of levers, load pickups to select the power operating conditions of an engine, means for connecting said load pickups with said centrifugal pickup, said connecting means including telescopic rods located within said hollow shaft, each of said rods being influenced by one pair of said levers, connecting members fixed on the ends of said telescopic rods and coacting with said load pickups, a control means, and a locking unit connected to said telescopic rods through said control means, with said locking unit preventing spontaneous gear shifting.

References Cited

UNITED STATES PATENTS

| | | | |
|---|---|---|---|
| 2,598,184 | 5/1952 | Long | 200—80 XR |
| 2,811,051 | 10/1957 | Weymann. | |
| 2,943,166 | 6/1960 | May | 200—80 |
| 2,950,367 | 8/1960 | McCathron | 200—80 |
| 3,195,671 | 7/1965 | Wolfe | 200—80 XR |

CARLTON R. CROYLE, Primary Examiner

A. D. HERRMANN, Assistant Examiner

U.S. Cl. X.R.

74—336; 200—80